United States Patent
Lee et al.

(10) Patent No.: US 9,432,087 B2
(45) Date of Patent: Aug. 30, 2016

(54) COMMUNICATION SYSTEM AND METHOD FOR NEAR FIELD COMMUNICATION

(71) Applicant: GOTRUST TECHNOLOGY INC., Taichung (TW)

(72) Inventors: Tien-Chi Lee, Taichung (TW); Jeng Lung Li, Taichung (TW); Yi-Hsiung Huang, Taichung (TW)

(73) Assignee: GOTRUST TECHNOLOGY INC., Taichung (TW)

( * ) Notice: Subject to any disclaimer, the term of this patent is extended or adjusted under 35 U.S.C. 154(b) by 0 days.

(21) Appl. No.: 14/622,399

(22) Filed: Feb. 13, 2015

(65) Prior Publication Data
US 2016/0099752 A1 Apr. 7, 2016

(30) Foreign Application Priority Data
Oct. 1, 2014 (TW) .............................. 103134198 A

(51) Int. Cl.
*H04B 5/00* (2006.01)
(52) U.S. Cl.
CPC .................................. *H04B 5/0031* (2013.01)
(58) Field of Classification Search
CPC .. H04B 5/0031; H04W 12/00; H04W 12/06; H04W 12/04

USPC .......................................... 455/41.1, 410, 411
See application file for complete search history.

(56) References Cited

U.S. PATENT DOCUMENTS

| | | | |
|---|---|---|---|
| 2012/0238207 A1* | 9/2012 | Marcovecchio .... | H04L 63/0492 455/41.1 |
| 2015/0181418 A1* | 6/2015 | Gargiulo ............... | H04M 15/06 455/414.2 |
| 2016/0055480 A1* | 2/2016 | Shah .................. | G06Q 20/3278 705/21 |

* cited by examiner

*Primary Examiner* — Ayodeji Ayotunde
(74) *Attorney, Agent, or Firm* — Muncy, Geissler, Olds & Lowe, P.C.

(57) ABSTRACT

A communication system includes an HCE application module and a security module. The HCE application module can carry out NFC and transmit an NFC signal in software format. The security module can provide a secure storage for storing at least one NFC applet, receive the NFC signal from the HCE application module, and carry out a process corresponding to the NFC signal. A communication method includes the steps of activating the HCE application module; enabling connection between the HCE application module and the security module; waiting for an NFC signal from an NFC reader; receiving the signal; processing and transmitting the signal to the security module; storing at least one transaction-related key and transaction-related data of the NFC signal and executing a process corresponding to the signal by the security module; and transmitting a responsive signal to the NFC reader.

12 Claims, 10 Drawing Sheets

COMMUNICATION SYSTEM AND METHOD FOR NEAR FIELD COMMUNICATION

BACKGROUND OF THE INVENTION

1. Field of the Invention

The present invention relates generally to electronic communication and more particularly, to a communication system and a communication method for near field communication (NFC).

2. Description of the Related Art

NFC is a new short-distance wireless connection technique, allowing electronic apparatuses to do contactless point-to-point data transmission between or among them. For recent years, the communication technology regarding mobile devices has been boomed and the mobile devices having built-in NFC can simplify the conventional shopping to help the people go on-line, receive, and share information more quickly and complete payment and transaction.

The application of NFC of a mobile device is primarily based on the interaction between the NFC reader and the security module of the mobile device. The security module of the mobile device can be a subscriber identity module (SIM) card, a microSD card, or an embedded security module. Most of commercially available mobile devices supporting NFC are of physical circuits based on single wire protocol (SWP) for guiding NFC signals to the SIM card of the mobile device for processing. However, it is difficult to apply such architecture to the cash flow of NFC-enabled transaction in practice. For example, if it is intended for a mobile phone to process NFC signals by means of a microSD card, it will be necessary to guide the NFC signal signals to the microSD card from the SIM card through a conducting wire, so it is very inconvenient in operation.

Among the state-of-the-art technology in this field, host card emulation (HCE) has been adopted by some manufacturers, providing ISO14443 and ISO 7816 standards for NFC and allowing software developers to devote themselves to development of software security modules without concern about the NFC-enabled communication.

HCE brings many different applications for NFC-enabled transactions from those of the conventional ones. Cash-flow vendors attempt to make applets existing in smart cards tokenized in clouds or mobile devices and make the tokenized applets interact with NFC readers by HCE. Such new NFC transaction method may though have the advantage of quick deployment, but the mobiles devices serving as cryptographic operation and token storage lead to a very high security risk, so such method has still been unprevalent.

Referring to FIG. 1, a mobile device 1 having an HCE system 10 installed therein includes an HCE application program 101 and an NFC controller 102. The mobile device 1 further includes a security module 103, which can reach the NFC controller 102 by means of SWP. When an external NFC reader 2 emits a signal S and the signal S is received by the mobile device 1, the NFC controller 102 can provide two paths for NFC. In the first path, a signal S reaches the NFC controller 102 via a path 21 and then the NFC controller 102 transmits the signal S to the HCE application program 101 via a path 22; the HCE system 10 is used for emulating an applet of the security module 103 for the purpose of NFC transaction. In the second path, the signal S reaches the NFC controller 102 via the path 21 and the NFC controller 102 transmits the signal S to the security module 103 via a path 23 by means of SWP. Thus, the second path is still the conventional physical circuit. The NFC controller 102 maintains an application ID routing table (not shown) for confirming the destination of the signal S. If the NFC controller 102 is provided with an applet ID (AID) of the security module 103, the NFC controller 102 will transmit the signal S to the second path; otherwise, the NFC controller 102 will transmit the signal S to the first path.

When the HCE system 10 carries out NFC via the first path, the signal S can be processed directly by the HCE application program 101. When the HCE system 10 carries out NFC via the second path, the signal S will be processed by the security module 103.

Although the HCE system 10 comes up with the simple software emulation to slash the threshold of development of NFC, however, the HCE application program 101 is devoid of secure storage that is available in the conventional security module 103, so some important keys (not shown) must be stored in software format to lead to security concern. Besides, the conventional SWP-based path 23 using the security module 103 (e.g. SIM card) for carrying out NFC is incompatible with the payment system of the existing banks serving as the primary cash flow.

In light of the above, an NFC-based communication system using the HCE technology for guiding NFC signals to the security module (e.g. microSD card) is needed for preventing the NFC signals from hardware limitation to SWP and avoiding the aforesaid drawback of the software emulation.

SUMMARY OF THE INVENTION

The primary objective of the present invention is to provide a communication system for NFC, which can prevent NFC signals from hardware limitation to SWP and avoiding the drawback of the software emulation of the prior art.

To achieve the foregoing objective of the present invention, the communication system includes an HCE application module and a security module. The HCE application module can carry out NFC and transmit an NFC signal in software format. The security module can provide a secure storage for storing at least one NFC applet, receive the NFC signal from the HCE application module, and carry out a process corresponding to the NFC signal.

Preferably, the HCE application module can further include an NFC controller and a data processing module. The NFC controller can determine a destination to which the NFC signal is transmitted. Two-way transmission can proceed between the data processing module and the security module and between the data processing module and the NFC controller, respectively.

Preferably, the NFC controller can further include an application ID routing table for confirming the destination of the NFC signal.

Preferably, the data processing module can further include a communication unit, a service unit, and a data processing unit. Two-way transmission can proceed between the communication unit and the security module, between the service unit and the NFC controller, between the data processing unit and the communication unit, and between the data processing unit and the service unit, respectively.

Preferably, the data processing unit can directly transmit the NFC signal, conditionally filter the NFC signal, collaboratively process the NFC signal, analyze/package the NFC signal, or package the NFC signal in batch.

Preferably, the service unit can identify the type of the NFC signal.

Preferably, the security module can further include a security unit and a control unit. The security unit is to store the at least one NFC applet and at least one key. The control unit can do two-way transmission with the HCE application module and identify whether the NFC signal received from the HCE application module should be transmitted to the security module.

Preferably, the security unit can further include an authentication unit and a transaction unit. The authentication unit can secure that the security module and the HCE application module are solely bundled. The transaction unit can execute the process corresponding to the NFC signal.

Preferably, the corresponding process includes computation of the NFC signal indicative of a request for transaction.

Preferably, the security module is a microSD, an SIM card, an embedded sensor, a wired external device, or a wireless external device.

Preferably, the communication system of the present invention can be installed in a mobile device.

In addition, the communication system of the present invention can further include a security transmission channel located between the HCE application module and the security module for securing that the HCE application module and the security module are solely bundled and the transmission of the NFC signal keeps confidential.

The secondary objective of the present invention is to provide a communication method for NFC, which can also prevent NFC signals from hardware limitation to SWP and avoiding the drawback of the software emulation of the prior art.

To achieve the foregoing objective, the communication method includes the following steps of activating an HCE application module installed in a mobile device by the mobile device; enabling connection between the HCE application module and a security module; waiting for an NFC signal transmitted from an NFC reader; receiving the NFC signal from the NFC reader by the HCE application module; processing the NFC signal and transmitting it to the security module by the HCE application module; storing at least one transaction-related key and transaction-related data of the NFC signal and executing a process corresponding to the NFC signal by the security module; and transmitting a responsive signal by the security module to the NFC reader.

Preferably, the corresponding process includes computation of the NFC signal indicative of a request for transaction.

DETAILED DESCRIPTION OF PREFERRED EMBODIMENTS

Figure 1:
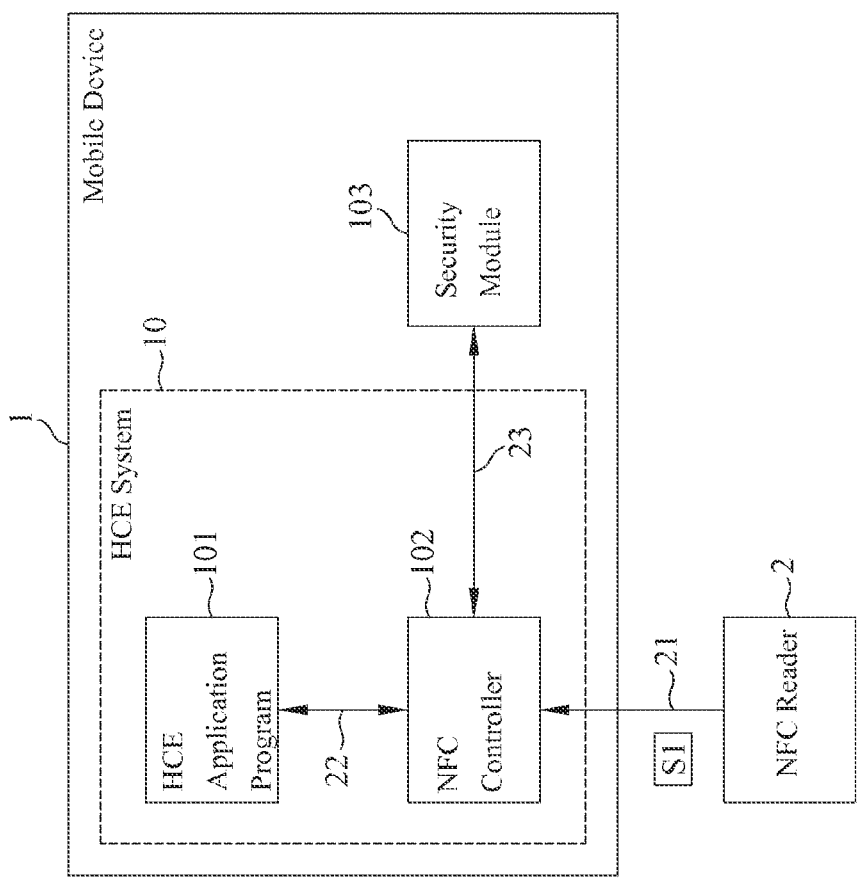
FIG. 1 is a block diagram of the conventional HCE system.
Figure 2:
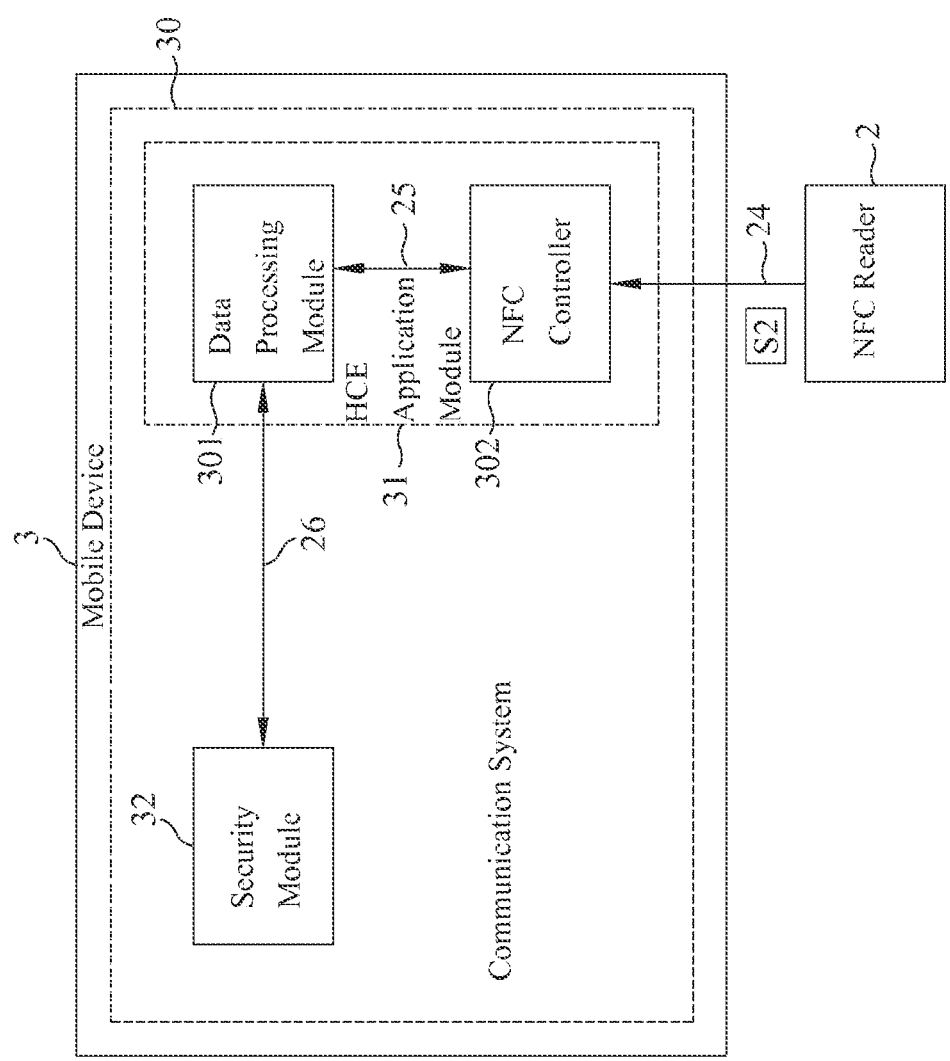
FIG. 2 is a block diagram of the communication system of the present invention.

Referring to FIG. 2, a communication system 30 of the present invention is installed in a mobile device 3 and includes an HCE application module 31 and a security module 32. The HCE application module 31 can realize NFC in software format and transmit an NFC signal S1 received thereby to the security module 32. The security module 32 is to store transaction-related keys and data of the NFC signal S1. While receiving the NFC signal S1, the security module 32 can execute a process corresponding to the NFC signal S1 and containing transaction-related cryptographic operation and then the security module 32 returns an NFC responsive signal (not shown) to the HCE application module 31. In this way, the present invention can use the HCE application module 31 to realize NFC and to guide the NFC signal S1 to the security module 32, so NFC transactions based on the present invention are not subject to the hardware limitation of SWP and do not have any drawback of HCE software-only simulation of NFC transactions.

Referring to FIG. 2 again, the HCE application module 31 includes a data processing module 301 and an NFC controller 302. After such an external device as the NFC reader 2 emits the signal S1, the signal S1 can be transmitted through a path 24 to the NFC controller 302 of the HCE application module 31 installed in a mobile device 3. The NFC controller 302 is provided with an application ID routing table (not shown) and is set for confirming the destination of the signal S1 by means of the application ID routing table. If the NFC controller 302 is provided with the AID of the security module, the NFC controller 302 will transmit the signal S1 through a path 25 to the data processing module 301 and then the data processing module 301 will transmit the signal S1 through a path 26 to the security module 32. In this embodiment, the NFC signal S1 is indicative of a request for transaction. After the NFC signal S1 is transmitted through the paths 24-26, the communication system 30 can be not subject to the hardware limitation of SWP and have none of any drawback of NFC using HCE software-only simulation.

Figure 3:
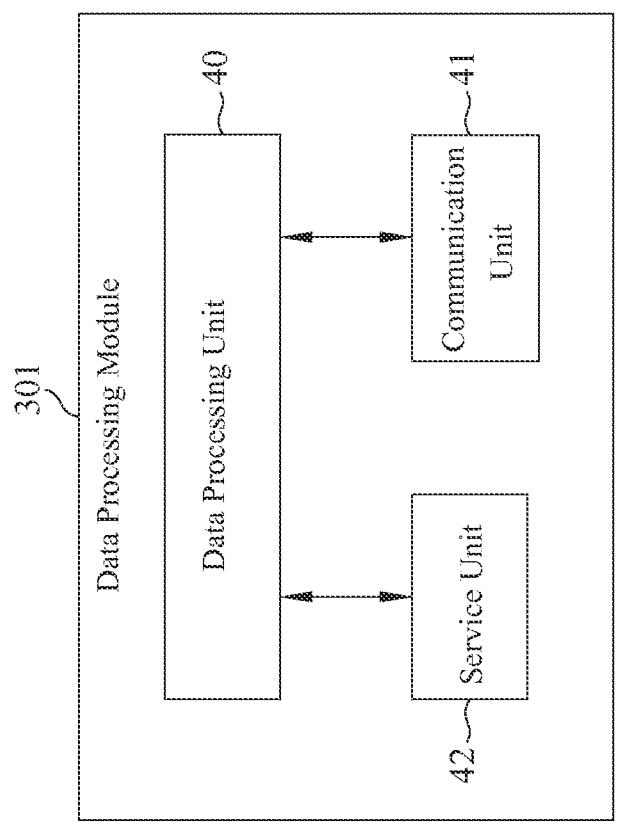
FIG. 3 is a block diagram of the data processing module of the present invention.

Referring to FIG. 3, the data processing module 301 includes a data processing unit 40, a communication unit 41, and a service unit 42. The data processing unit 40 can proceed with two-way transmission with the communication unit 41 and the service unit 42, respectively. The data processing unit 40 can process data transmitted from the NFC reader 2 and the security module 32 in either of various manners. For example, the data processing unit 40 can directly transmit the signal S1, conditionally filter the signal S1, collaboratively process the signal S1, analyze/package the signal S1, or package the signal S1 in batch. The communication unit 41 can proceed with two-way transmission with the security module 32. The service unit 42 can receive the signal S1 from the NFC reader 2 and identify the type of the signal S1 to prevent the mobile device 3 from receiving any signal that cannot be processed by the data processing module 301. After the identification is completed, the service unit 42 can allow the signal S1 to enter the data processing unit 40 for the data processing unit 40 to process the signal S1.

Figure 4:
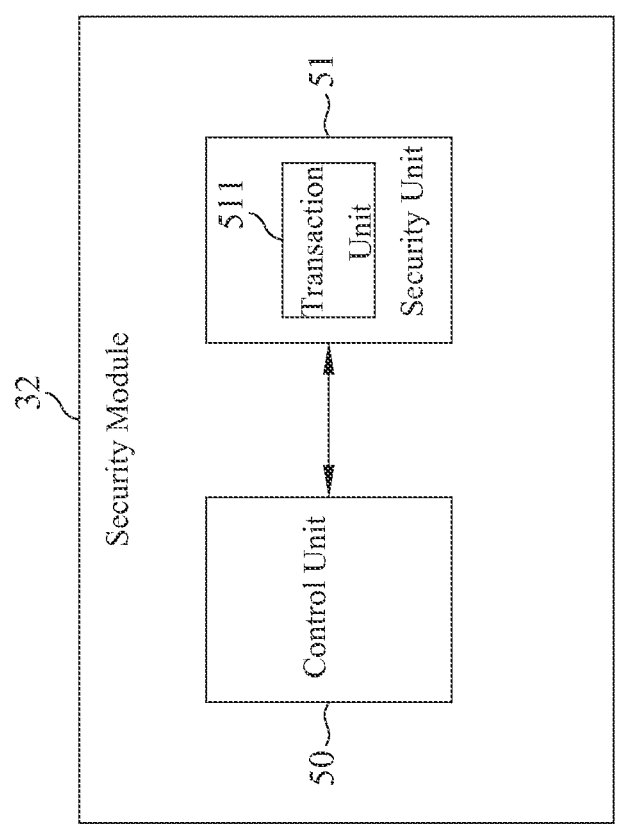
FIG. 4 is a block diagram of the security module of the present invention.

Referring to FIG. 4, the security module 32 includes a control unit 50 and a security unit 51. The security unit 51 includes a transaction unit 511 and can be a microSD card, a SIM card, an embedded sensor, a wired external device, or a wireless external device. In this embodiment, the security module 32 is a microSD card. The control unit 50 and the security unit 51 can proceed with two-way transmission therebetween. The control unit 50 can communicate with the data processing module 301. The security unit 51 can store at least one key and at least one applet relevant with NFC transaction. The transaction unit 511 can process an NFC signal indicative of a request for transaction which is transmitted to the security module 32. Specifically, the transaction unit 511 can carry out computation of the NFC signal indicative of a request for transaction and then emit a responsive signal to the NFC reader 2.

Figure 5:
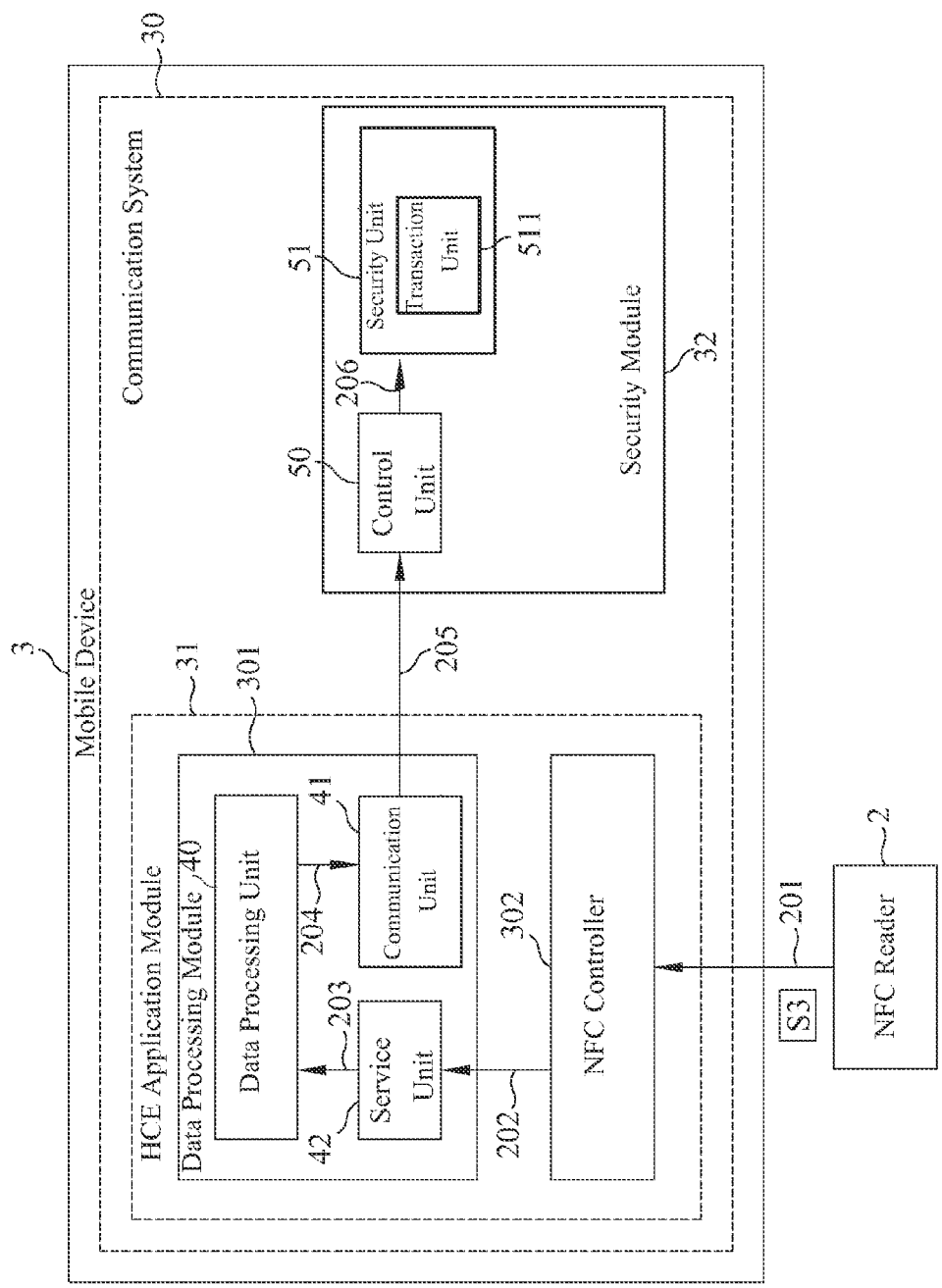
FIG. 5 is a block diagram of a first preferred embodiment of the present invention, illustrating the signal transmission of the communication system after the NFC reader receives the NFC signal.

Referring to FIG. 5, when a user (not shown) makes the mobile device 3 installed with the communication system 30 in accordance with a first preferred embodiment of the present invention approach the NFC reader 2 within a predetermined distance, the NFC reader 2 can transmit an NFC transaction signal S2 to the mobile device 3 and then the NFC transaction signal S2 is transmitted to the NFC controller 302 through a path 201. The NFC controller 302 includes an application ID routing table (not shown) and is set for confirming the destination of the NFC transaction signal S2 by means of the application ID routing table. If the NFC controller 302 registers the AID of the security module 32, the NFC controller 302 will transmit the NFC transaction signal S2 to the service unit 42 through a path 202. The service unit 42 can identify the type of the NFC transaction signal S2 to prevent the mobile device 3 from receiving data that cannot be processed by the data processing module 301. After the identification is completed, the service unit 42 can transmit the NFC transaction signal S2 to the data processing unit 40 through a path 203 and then the data processing unit 40 can process the NFC transaction signal S2 in either of various manners. In this embodiment, the data processing unit 40 can transmit the NFC transaction signal S2 straight to the communication unit 41 through a path 204 and then the control unit 50 can identify whether the type of the received NFC transaction signal S2 that should be transmitted to the security unit 51 is correct. If the type is correct, the control unit 50 will transmit the NFC transaction signal S2 to the security unit 51 through a path 206 and the transaction unit 511 can process the NFC transaction signal S2.

Figure 6:
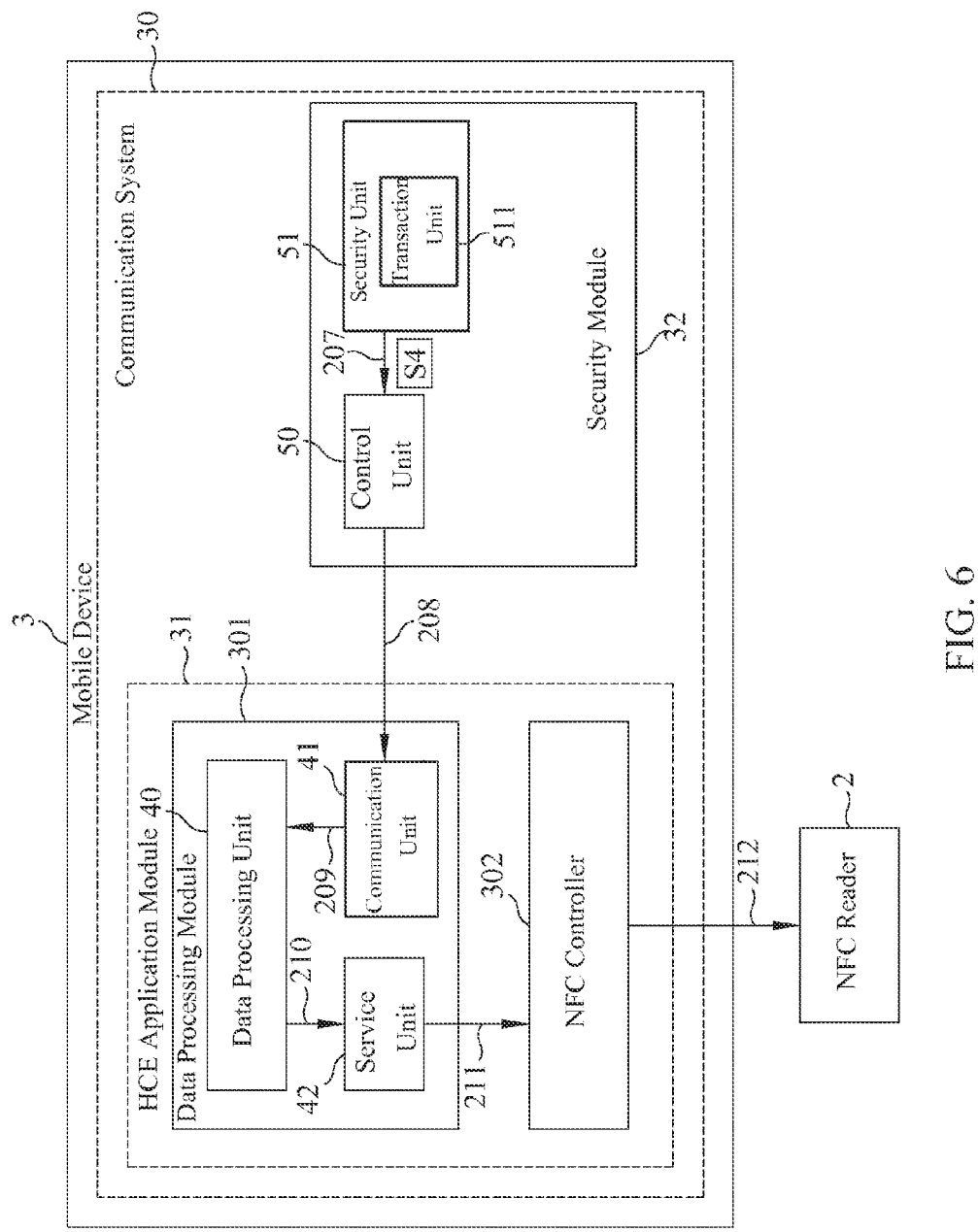
FIG. 6 is a block diagram of the first preferred embodiment of the present invention, illustrating the signal transmission that the communication system returns an NFC responsive signal.

Referring to FIG. 6, after the NFC transaction signal S2 is processed, the transaction unit 511 returns an NFC responsive signal S3 to the control unit 50 through a path 207. The NFC responsive signal S3 is a feedback datum generated after the security module 32 finishes processing the NFC transaction signal S2, namely the signal indicative of a request for transaction from the NFC reader 2. Next, the control unit 50 transmits the NFC responsive signal S3 to the communication unit 41 through a path 208 and then the communication unit 41 can transmit the NFC responsive signal S3 to the data processing unit 40 through a path 209. In the meantime, the data processing unit 40 can process the NFC responsive signal S3 in either of various manners. For example, the data processing unit 40 can transmit the NFC responsive signal S3 straight to the service unit 42 via a path 210. Next, the service unit 42 can transmit the NFC responsive signal S3 to the NFC controller 302 through a path 211. Finally, the NFC controller 302 transmits the NFC responsive signal S3 back to the NFC reader 2 through a path 212. By means of a series of transmission of the signals S2 and S3, the NFC reader 2 can use the HCE application module 31 to establish connection with the security module 32 and then the security module 32 can process the NFC transaction signal S2 received from the NFC reader 32 until the NFC transaction signal S2 is terminated.

Referring to FIGS. 5 and 6 again, in the first preferred embodiment, when the data transmission is proceeding between the communication unit 41 and the control unit 50 through the paths 205 and 208, malicious people or hackers may be able to emit malicious data through the paths 205 and 208. Under the circumstances, the present invention comes up with a solution to this problem, namely securing the communication security between the data processing module 301 and the security module 32, as recited in the following paragraphs. This solution is optional for the user.

Figure 7:
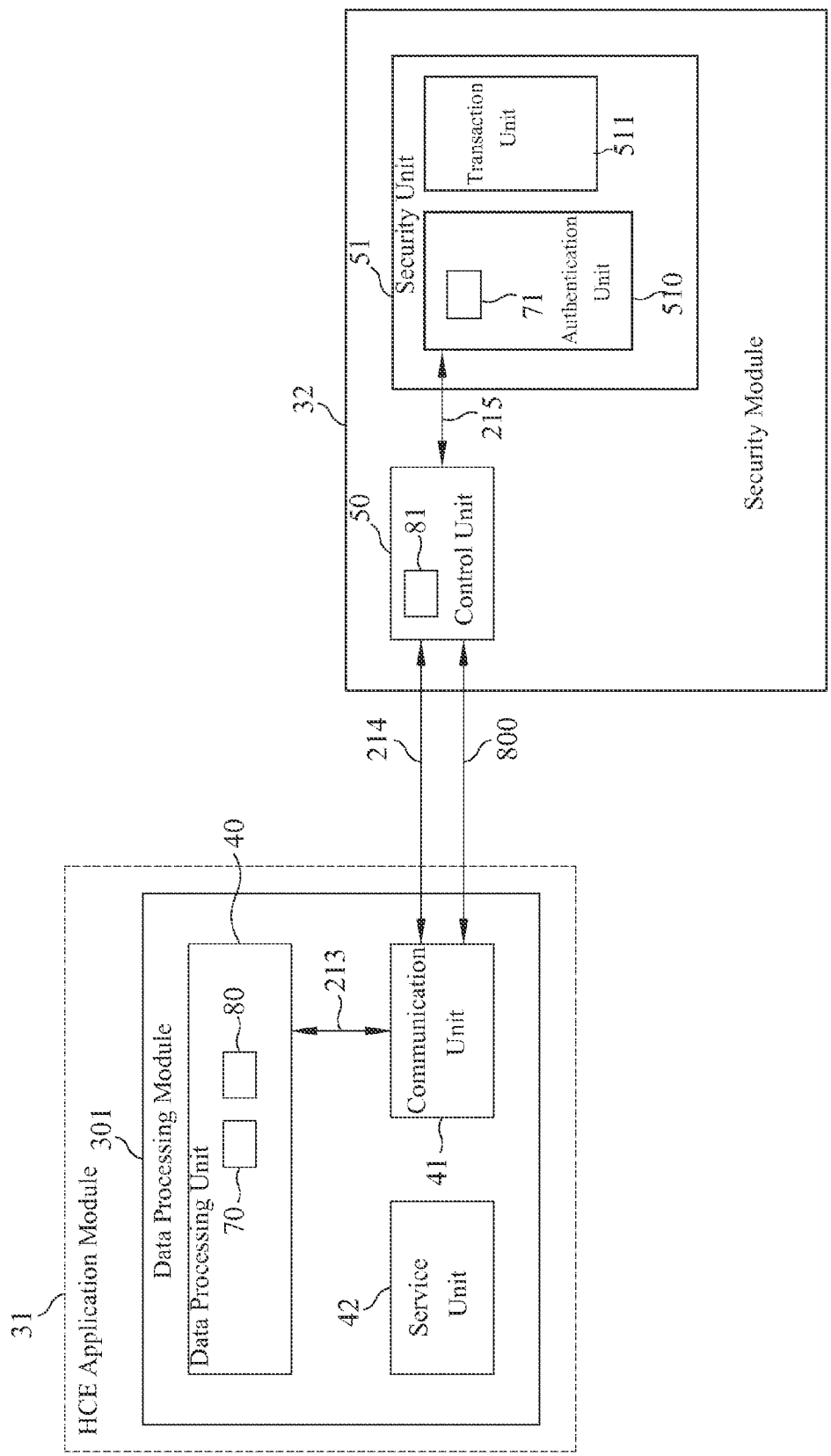
FIG. 7 is a block diagram of the present invention, illustrating the method of setting up secure transmission channel.

Referring to FIG. 7, before the mobile device 3 and the NFC reader 2 proceed with NFC, it is necessary to establish a secure transmission channel 800 where the security unit 51 further includes an authentication unit 510 for securing that the security module 32 and the HCE application module 31 are solely bundled. The first step of establishing the secure transmission channel 800 is to proceed with two-way authentication between the HCE application module 31 and the security module 32. Before the two-way authentication proceeds, each of the data processing module 301 and the security module 32 is preloaded with a secure channel master key 70(71). Each of the secure channel master keys 70 and 71 is provided for two-way authentication and creating a session key 80(81). In the data processing module 301, the secure channel master key 70 is stored in either the data processing unit 40 or the communication unit 41. In the security unit 51, the secure channel master key 71 is stored in either the control unit 50 or the authentication unit 510. In this embodiment, the secure channel master key 70 is stored in the data processing unit 40 and the other 71 is stored in the authentication unit 510. When the data processing module 301 and the security unit 51 are preloaded with the secure channel master keys 70 and 71, the two-way authentication starts to be carried out. The authentication can be but not limited to challenge-response authentication. When the challenge-response authentication proceeds, the data processing unit 40 can generate a first challenge (not shown) and then the first challenge can be transmitted to the communication unit 41 through a path 213. Next, the communication unit 41 can transmit the first challenge to the control unit 50 via a path 214 and then the control unit 50 can further transmit the first challenge to the authentication unit 510. After that, the authentication unit 510 can apply cryptographic operation (e.g. encryption or decryption) to the first challenge by means of the secure channel master key 71. After the cryptographic operation is done, the authentication unit 510 can return a first response (not shown) to the control unit 50 through a path 215, the control unit 50 returns the first response to the communication unit 41 through the path 214, and the communication unit 41 returns the first response to the data processing unit 40 through the path 213. The data processing 40 can verify whether the first response is correct. If the first response is correct, the security unit 51 will be verified to be rightful. Otherwise, the authentication unit 510 will similarly generate a second challenge (not shown) and then the second challenge will be transmitted to the control unit 50 through the path 215; after that, the control unit 50 can transmit the second challenge to the communication unit 41 through the path 214 and then the communication unit 41 can further transmit the second challenge to the data processing unit 40 through the path 213. Next, the data processing unit 40 can apply cryptographic operation to the challenge by means of the secure channel master key 70. After the cryptographic operation is done, the data processing unit 40 can transmit a second response (not shown) to the communication unit 41 and then the communication unit 41 can return the second response to the control unit through the path 214. After that, the control unit 50 can return the second response to the authentication unit 510 through the path 215 and finally the authentication unit 510 verifies whether the second response is correct. If the second response is correct, the data processing unit 301 will be verified to be rightful. After the two-way authentication between HCE application module 31 and the security module 32 is done, each of the HCE application module 31 and the security module 32 can create a session key 80(81) for protecting the data transmitted through the secure transmission channel 800. How the session keys 80 and 81 are created is not limited to key diversification. After created, the session key 80 is stored in the data processing unit 40 and the session key 81 is stored in the control unit 50. In this embodiment, the processes of authentication of the secure channel master keys 70 and 71 and the creation of the session keys 80 and 81 can be further packaged to become a secure channel establishment protocol to make the authentication and the creation more efficient.

Referring to FIG. 7, after the session keys 80 and 81 are created, the HCE application module 31 and the security module 32 can proceed with encrypted communication to establish the secure transmission channel 800. The method of the encryption between the HCE application module 31 and the security module 32 can be but not limited to symmetric encryption, e.g. data encryption standard (DES) or advanced encryption standard (AES). When the encrypted communication between the HCE application module 31 and the security module 32 is completed, the secure transmission channel 800 can be established between the HCE application module 31 and the secure module 32. Once the secure transmission channel 800 is established, it will be secured that the HCE application module 31 and the security module 32 are solely bundled and the data transmission keeps confidential.

Figure 8:
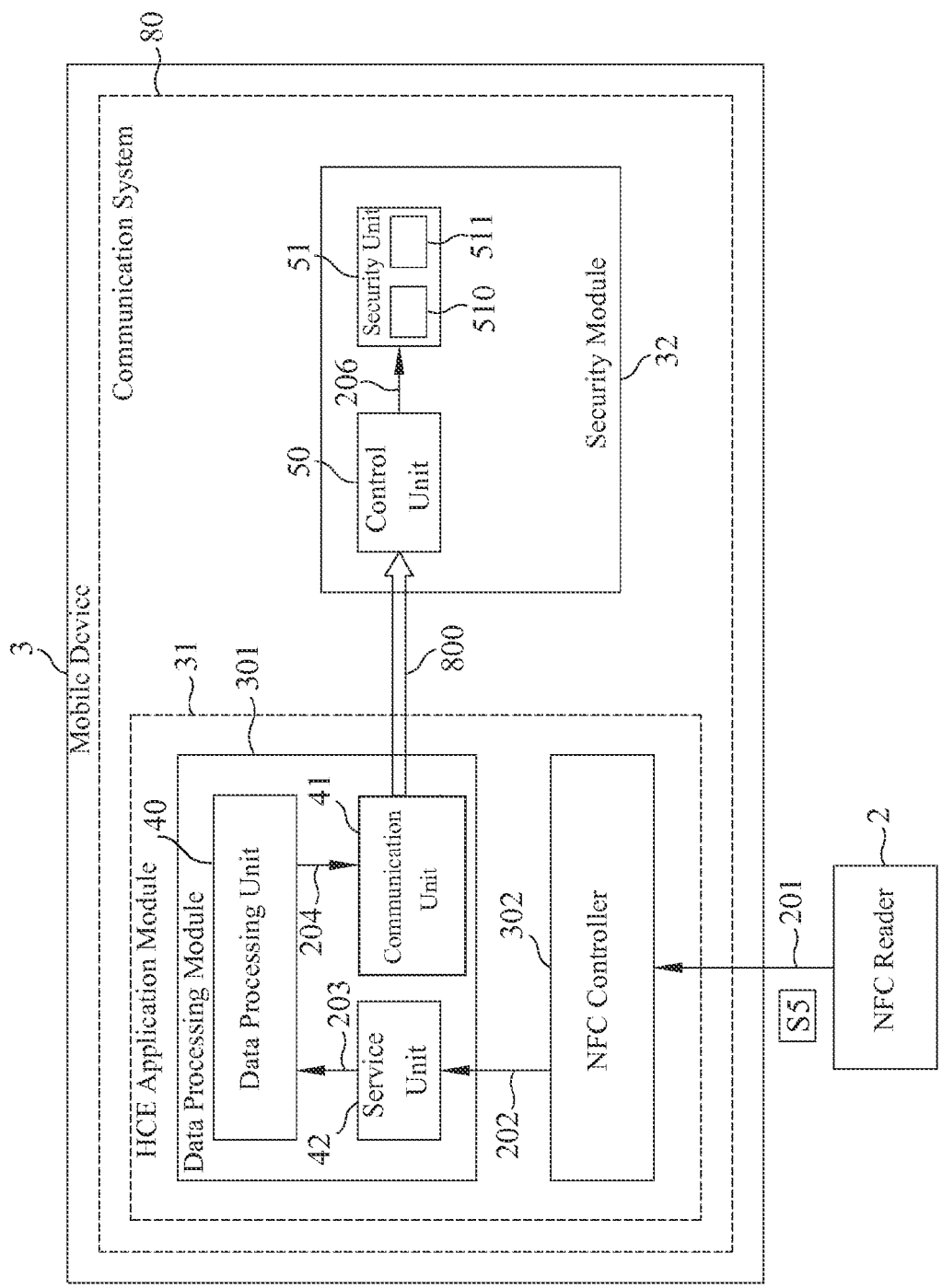
FIG. 8 is a block diagram of a second preferred embodiment of the present invention, illustrating the signal transmission of the communication system having the secure transmission channel after the NFC reader receives the NFC signal.

Referring to FIG. 8, when a user (not shown) makes the mobile device 3 installed with a communication system 80 having the secure transmission channel 800 in accordance with a second preferred embodiment of the present invention approach the NFC reader 2 within a predetermined distance, the NFC reader 2 can transmit an NFC transaction S4 to the mobile device 3 and then the NFC transaction signal S4 is transmitted to the NFC controller 302 through a path 201. The NFC controller 302 is provided with an application ID routing table (not shown) and set for confirming the destination of the NFC transaction signal S4 by means of the application ID routing table. If the NFC controller 302 is registered with the application ID, the NFC controller 302 can transmit the NFC transaction signal S4 to the service unit 42 through a path 202 and then the service unit 42 can identify the type of the NFC transaction signal S4 to prevent the mobile device 3 from receiving any signal that cannot be processed by the data processing module 301. After the identification, the service unit 42 can transmit the NFC transaction signal S4 to the data processing unit 40 through a path 203 and then the data processing unit 40 can transmit the NFC transaction signal S4 straight to the communication unit 41 through a path 204. Next, the communication unit 41 can transmit the NFC transaction signal S4 to the control unit 50 through the secure transmission channel 800. The secure transmission channel 800 can secure that the HCE application module 31 and the security module 32 are solely bundled and the transmission of the NFC transaction signal S4 keeps confidential, thus preventing malicious personnel from arbitrarily sending malicious data in the process of the transmission of the NFC transaction signal S4 through the secure transmission channel 800. The control unit 50 can identify whether the type of the NFC transaction signal S4 that should be transmitted to the security unit 51 is correct. If the type is correct, the control unit 50 can transmit the NFC transaction signal S4 to the security unit 51 through the path 206. At last, the security unit 51 can process the NFC transaction signal S4 and then return an NFC responsive signal S5, which is a feedback datum generated after the security module 32 finishes processing the NFC transaction signal S4.

Figure 9:
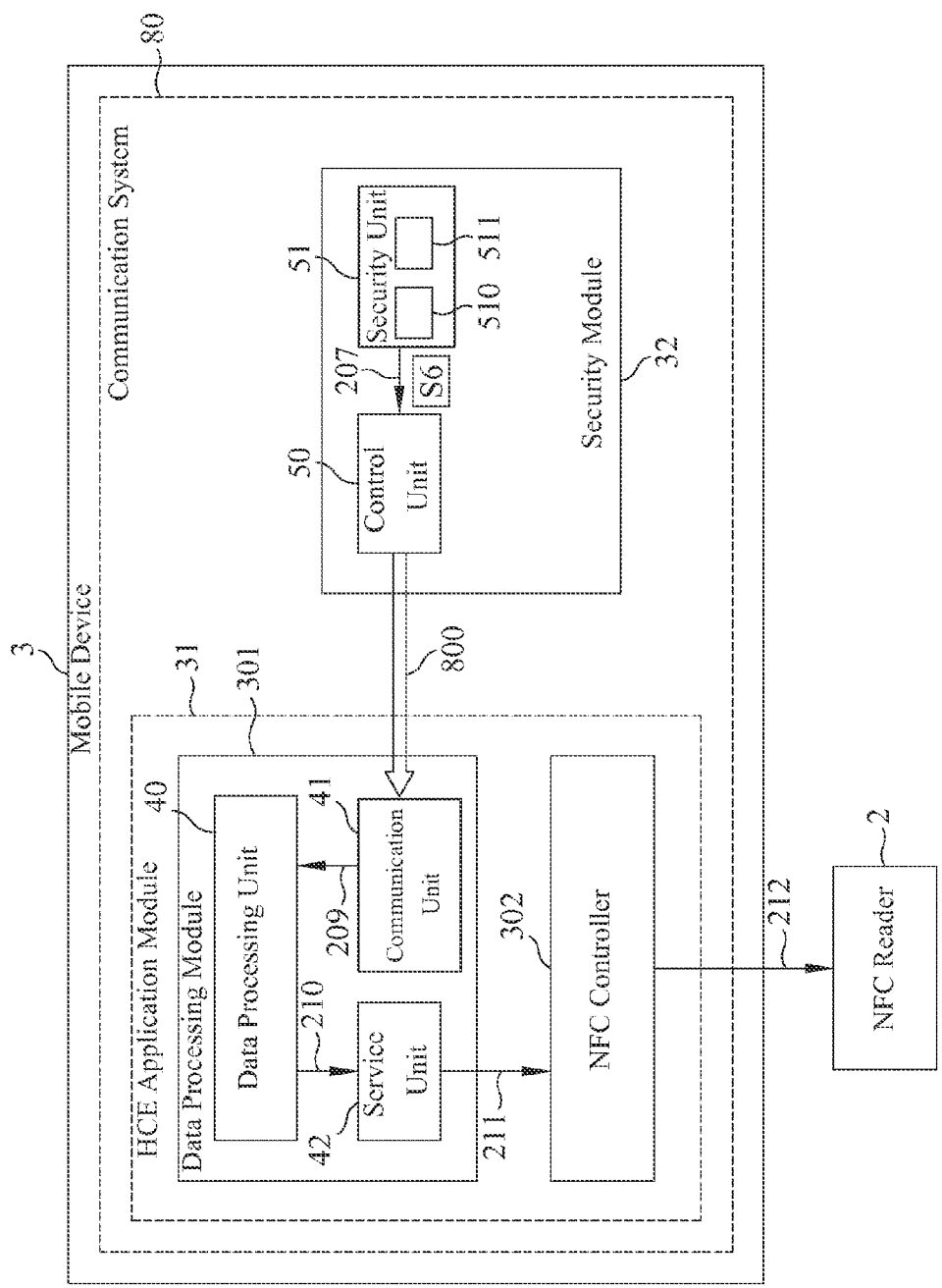
FIG. 9 is a block diagram of the second preferred embodiment of the present invention, illustrating the signal transmission that the communication system having the secure transmission channel returns an NFC responsive signal.

Referring to FIG. 9, the transaction unit 511 returns the NFC responsive signal S5 to the control unit 50 through the path 207 and then the control unit 50 can transmit the NFC responsive signal S5 to the communication unit 41 through the secure transmission channel 800. The secure transmission channel 800 can secure that the HCE application module 31 and the security module 32 are solely bundled and the NFC responsive signal S5 keeps confidential, thus preventing the malicious personnel from arbitrarily sending malicious data through the secure transmission channel 800 while the NFC responsive signal S5 is being transmitted through the secure transmission channel 800. Next, the communication unit 41 can transmit the NFC responsive signal S5 to the data processing unit 40 through the path 209 and then the data processing unit 40 can process the NFC responsive signal S5 in either of various manners. In this second preferred embodiment, the data processing unit 40 can transmit the NFC responsive signal S5 straight to the service unit 42 through the channel 210, then the service unit 42 transmit the NFC responsive signal S5 to the NFC controller 302 through the path 211, and finally the NFC controller 302 returns the NFC responsive signal S5 to the NFC reader 2 through the path 212. By means of a series of transmission of the NFC transaction signal S4 and the NFC responsive signal S5, the NFC reader 32 can create the connection between the HCE application module 31 and the security module and the security module 32 can process the NFC transaction signal S4 emitted from the NFC reader 2 until the NFC transaction signal S4 is terminated.

Figure 10:
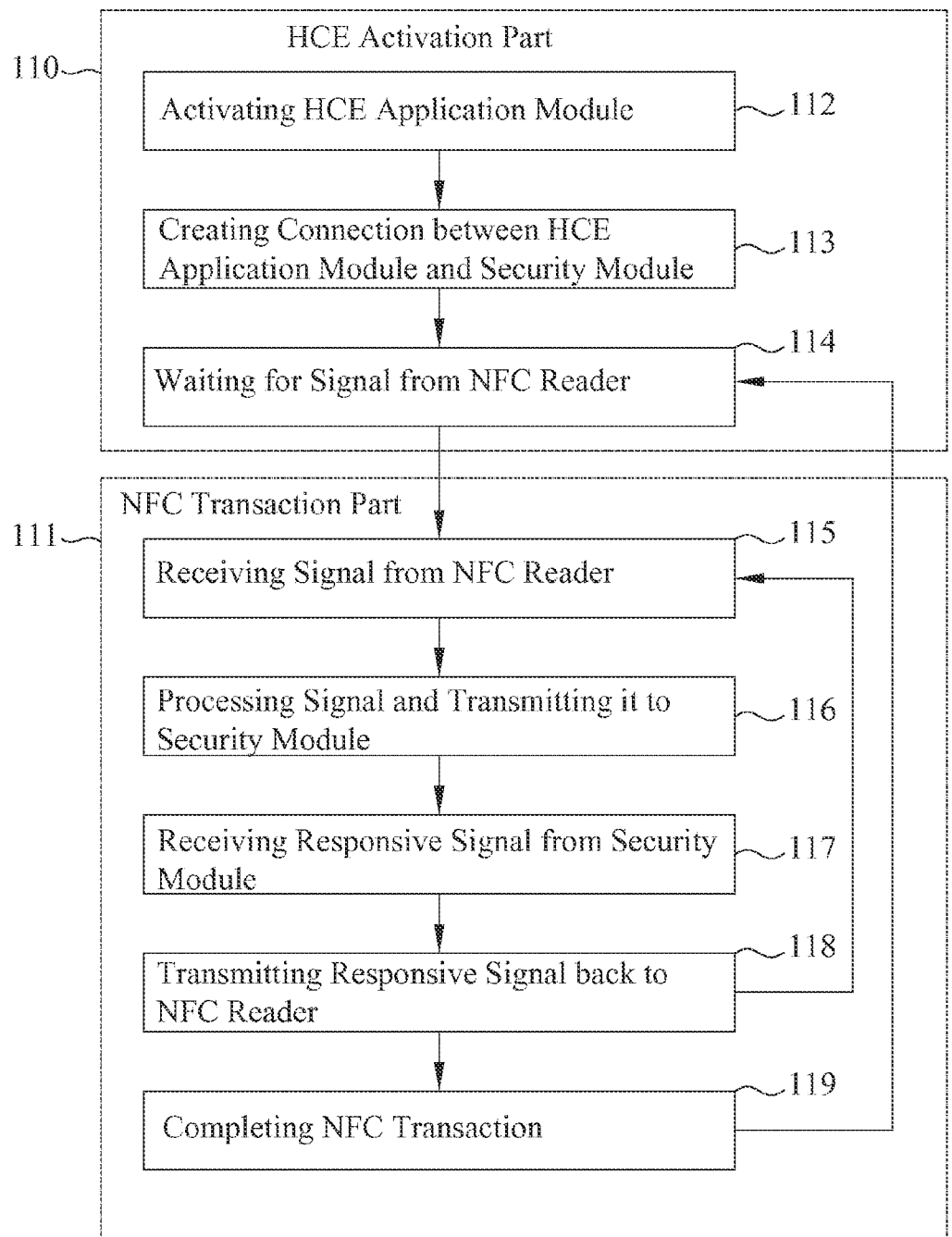
FIG. 10 is flow chart of the communication method of the present invention, illustrating that the mobile device of the present invention is applied to NFC.

Referring to FIG. 10 in view of FIGS. 5 and 6 again, a communication method of the present invention for NFC includes an HCE activation part 110 and an NFC transaction part 111. The HCE activation part 110 includes steps 112-114. In the step 112, a user (not shown) activates the HCE application module 31 installed in the mobile device 3. In the step 113, after the HCE application module 31 is activated, the secure connection between the HCE application module 31 and the security module 32 is established. In the step 114, the mobile device 3 waits for the transaction signal S2 emitted from the NFC reader 2. As soon as the mobile device 3 receives the transaction signal S2 from the NFC reader 2, the communication method will proceed to the NFC transaction part 111.

The NFC transaction part 111 includes steps 115-119. In the step 115, the HCE application module 31 receives the NFC transaction signal S2 from the NFC reader 2. In the step 116, the HCE application module 31 processes the NFC transaction signal S2 and transmits it to the security module 32. In the step 117, the security module 32 stores the transaction-related keys and data of the NFC signal S2; after receiving the NFC transaction signal S2, the security module 32 carries out a process (e.g. transaction-related cryptographic operation) corresponding to the NFC transaction signal S2; next, the security module 32 returns the NFC transaction signal S3 to the HCE application module 31. In the step 118, the HCE application module 31 returns the NFC transaction signal S3 to the NFC reader 2 or keeps receiving and processing the NFC transaction signal S2 from the NFC reader 2 as indicated in the step 15; once the NFC transaction S2 is terminated, the communication method proceeds to the step 119. In the step 119, the communication system 30 completes the NFC transaction. Next, the communication method returns to the step 114, namely waiting for another transaction signal from the NFC reader 2.

Although the present invention has been described with respect to specific preferred embodiments thereof, it is in no way limited to the specifics of the illustrated structures but changes and modifications may be made within the scope of the appended claims.

What is claimed is:

1. A communication system for near field communication (NFC), comprising:
  a host card emulation (HCE) application module for carrying out NEC and transmitting the NFC signal in software format; and
  a security module for providing a secure storage storing at least one NFC applet, for receiving the NEC signal from the HCE application module, and for executing a process corresponding to the NFC signal,
  wherein the HCE application module comprises:
    an NFC controller that includes an application identification (ID) routing table, receives the NEC signal from the external NFC signal source and determines a destination of the NFC signal; and
    a data processing module that receives the NEC signal from the NEC controller and performs two-way communication with the security module based on the destination of the NFC signal determined by the NFC controller, the data processing module including:
      a communication unit that is connected to the security module and performs the two-way communication with the security module;
      a service unit that is connected to the NFC controller and performs the two-way communication with the NFC controller; and
      a data processing unit that is connected to the communication unit and the service unit and controls the two-way communications performed by the communication unit and the service unit.

2. The communication system as defined in claim 1, wherein the data processing unit is capable of directly transmitting the NFC signal, conditionally filtering the NFC signal, collaboratively processing the NFC signal, analyzing/packaging the NFC signal, or packaging the NFC signal in batch.

3. The communication system as defined in claim 1, wherein the service unit is capable of identifying a type of the NFC signal.

4. The communication system as defined in claim 1, wherein the security module comprises:
  a security unit for storing the at least one NFC applet and at least one key; and
  a control unit for two-way communication with the HCE application module and for identifying whether the received NFC signal is to be transmitted to the security unit.

5. The communication system as defined in claim 4, wherein the security unit further comprises:
  an authentication unit for securing that the security module and the HCE application module are solely bundled; and
  a transaction unit for executing the process corresponding to the NFC signal.

6. The communication system as defined in claim 5, wherein the process comprises execution of computation of the NFC signal indicative of a request for transaction.

7. The communication system as defined in claim 1, wherein the security module is a microSD card, an embedded sensor, a wired external device, or a wireless external device.

8. The communication system as defined in claim 1, wherein the communication device is mounted inside a mobile device.

9. The communication system as defined in claim 1 further comprising a secure transmission channel, which is located between the HCE application module and the security module for securing that the HCE application module and the security module are solely bundled and the transmission of the NFC signal is confidential.

10. A communication method for NFC using a mobile device that includes a host card emulation (HCE) application module and a security module that are connected to each other, the HCE application module including an NFC controller and a data processing module that are connected to each other, the method comprising steps of:
  activating the HCE application module;
  creating a connection between the HCE application module and the security module;
  waiting for an NFC signal from an external NFC reader;
  receiving the NFC signal by the NFC controller of the HCE application module;
  receiving the NFC signal from the NFC controller by a service unit of the data processing module, the service unit being connected to the NFC controller;
  processing the NFC signal by a data processing unit of the data processing module, the data processing unit being connected to the service unit;
  transmitting the NFC signal to the security module by a communication unit of the data processing module, the communication unit being connected to the security module and the data processing unit;
  storing at least one transaction-related key and transaction-related data of the NFC transaction signal in the security module and executing a process corresponding to the NFC signal by the security module;
  transmitting a responsive signal to the HCE application module by the security module via the communication unit, the data processing unit and the service unit of the data processing module of the HCE application module; and
  transmitting the responsive signal to the NFC reader by the NFC controller of the HCE application module.

11. The communication method as defined in claim 10, wherein the process comprises execution of the NFC signal indicative of a request for transaction.

12. The communication system as defined in claim 1, wherein the process comprises execution of computation of the NFC signal indicative of a request for transaction.

* * * * *